US008915087B2

(12) United States Patent
McMahan et al.

(10) Patent No.: US 8,915,087 B2
(45) Date of Patent: Dec. 23, 2014

(54) METHODS AND SYSTEMS FOR TRANSFERRING HEAT FROM A TRANSITION NOZZLE

(75) Inventors: Kevin Weston McMahan, Greer, SC (US); Ronald James Chila, Greenville, SC (US); David Richard Johns, Greenville, SC (US)

(73) Assignee: General Electric Company, Schenectady, NY (US)

( * ) Notice: Subject to any disclaimer, the term of this patent is extended or adjusted under 35 U.S.C. 154(b) by 754 days.

(21) Appl. No.: 13/164,908

(22) Filed: Jun. 21, 2011

(65) Prior Publication Data

US 2012/0324897 A1 Dec. 27, 2012

(51) Int. Cl.
*F02C 1/00* (2006.01)
*F01D 9/02* (2006.01)
*F23R 3/00* (2006.01)

(52) U.S. Cl.
CPC ................ *F01D 9/023* (2013.01); *F23R 3/002* (2013.01); *F23R 3/005* (2013.01); *F05D 2260/2214* (2013.01); *F23R 2900/03045* (2013.01)
USPC ................................. 60/772; 60/752; 60/759

(58) Field of Classification Search
USPC ........................................ 60/39.37, 752–760
See application file for complete search history.

(56) References Cited

U.S. PATENT DOCUMENTS

| | | | | |
|---|---|---|---|---|
| 4,719,748 A | 1/1988 | Davis, Jr. et al. | | |
| 4,984,429 A | 1/1991 | Waslo et al. | | |
| 6,021,570 A | 2/2000 | Lockyer et al. | | |
| 6,205,789 B1 | 3/2001 | Patterson et al. | | |
| 6,568,187 B1 | 5/2003 | Jorgensen et al. | | |
| 6,640,547 B2 | 11/2003 | Leahy, Jr. | | |
| 6,681,578 B1 | 1/2004 | Bunker | | |
| 6,761,031 B2 | 7/2004 | Bunker | | |
| 7,007,482 B2 | 3/2006 | Green et al. | | |
| 7,082,766 B1 | 8/2006 | Widener et al. | | |
| 7,104,067 B2 | 9/2006 | Bunker | | |
| 7,373,778 B2 | 5/2008 | Bunker et al. | | |
| 7,386,980 B2 | 6/2008 | Green et al. | | |
| 7,617,684 B2 | 11/2009 | Norster | | |
| 7,757,492 B2 * | 7/2010 | Intile et al. | ...................... | 60/752 |
| 7,886,545 B2 * | 2/2011 | Lacy et al. | ...................... | 60/804 |
| 8,015,817 B2 * | 9/2011 | Charron et al. | ................. | 60/752 |
| 8,186,167 B2 * | 5/2012 | Chila et al. | ...................... | 60/752 |
| 8,245,515 B2 * | 8/2012 | Davis et al. | ..................... | 60/752 |
| 8,549,861 B2 * | 10/2013 | Huffman | ......................... | 60/760 |
| 2010/0037620 A1 | 2/2010 | Chila | | |
| 2010/0071379 A1 | 3/2010 | Woodcock et al. | | |
| 2010/0077761 A1 | 4/2010 | Johnson et al. | | |
| 2010/0077763 A1 | 4/2010 | Alkabie | | |
| 2010/0205972 A1 * | 8/2010 | Chila et al. | ...................... | 60/752 |
| 2012/0304656 A1 * | 12/2012 | Melton et al. | .................. | 60/752 |

* cited by examiner

*Primary Examiner* — William H Rodriguez
*Assistant Examiner* — Arun Goyal
(74) *Attorney, Agent, or Firm* — Armstrong Teasdale LLP

(57) ABSTRACT

Methods and systems are provided for transferring heat from a transition nozzle. The transition nozzle includes a transition portion, a nozzle portion integrally formed with the transition portion, and at least one surface feature configured to transfer heat away from the transition portion and/or the nozzle portion. The transition portion is oriented to channel the combustion gases towards the nozzle portion.

20 Claims, 7 Drawing Sheets

METHODS AND SYSTEMS FOR TRANSFERRING HEAT FROM A TRANSITION NOZZLE

BACKGROUND

The present disclosure relates generally to turbine systems and, more particularly, to a transition nozzle that may be used with a turbine system.

At least some known gas turbine systems include a combustor that is distinct and separate from a turbine. During operation, some such turbine systems may develop leakages between the combustor and the turbine that may impact the emissions capability (i.e., NOx) of the combustor and/or may decrease the performance and/or efficiency of the turbine system.

To reduce such leakages, at least some known turbine systems include a plurality of seals between the combustor and the turbine. Over time, however, operating at increased temperatures may weaken the seals between the combustor and turbine. Maintaining such seals may be tedious, time-consuming, and/or cost-inefficient.

Additionally or alternatively, to increase emissions capability, at least some known turbine systems increase an operating temperature of the combustor. For example, flame temperatures within some known combustors may be increased to temperatures in excess of about 3900° F. However, increased operating temperatures may adversely limit a useful life of the combustor and/or turbine system.

BRIEF DESCRIPTION

In one aspect, a method is provided for assembling a turbine assembly. The method includes integrally forming a transition nozzle including a transition portion and a nozzle portion. The transition nozzle includes at least one surface feature positioned to transfer heat away from the transition portion and/or the nozzle portion. The transition portion is oriented to channel combustion gases towards the nozzle portion.

In another aspect, a transition nozzle is provided for use with a turbine assembly. The transition nozzle includes a transition portion, a nozzle portion integrally formed with the transition portion, and at least one surface feature configured to transfer heat away from the transition portion and/or the nozzle portion. The transition portion is oriented to channel combustion gases towards the nozzle portion.

In yet another aspect, a turbine assembly is provided. The turbine assembly includes a fuel nozzle configured to mix fuel and air to create a fuel and air mixture, and a transition nozzle oriented to receive the fuel and air mixture from the fuel nozzle. The transition nozzle includes a transition portion, a nozzle portion integrally formed with the transition portion, and at least one surface feature configured to transfer heat away from the transition portion and/or the nozzle portion. The transition portion is oriented to channel the combustion gases towards the nozzle portion.

The features, functions, and advantages described herein may be achieved independently in various embodiments of the present disclosure or may be combined in yet other embodiments, further details of which may be seen with reference to the following description and drawings.

DETAILED DESCRIPTION

The subject matter described herein relates generally to turbine assemblies and more particularly to a transition nozzle that may be used with a turbine assembly. In one embodiment, the transition nozzle is a unitary component including a liner portion, a transition portion, and a nozzle portion. In such an embodiment, the transition nozzle includes at least one surface feature configured to transfer heat away from the transition nozzle to facilitate cooling the liner, the turbine nozzle, and/or the transition piece. As such, the at least one surface feature enables the transition nozzle to withstand greater thermal loading, operate with increased operating temperatures, and operate with increased emissions capabilities.

As used herein, the terms "axial" and "axially" refer to directions and orientations extending substantially parallel to a longitudinal axis of a combustor. As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
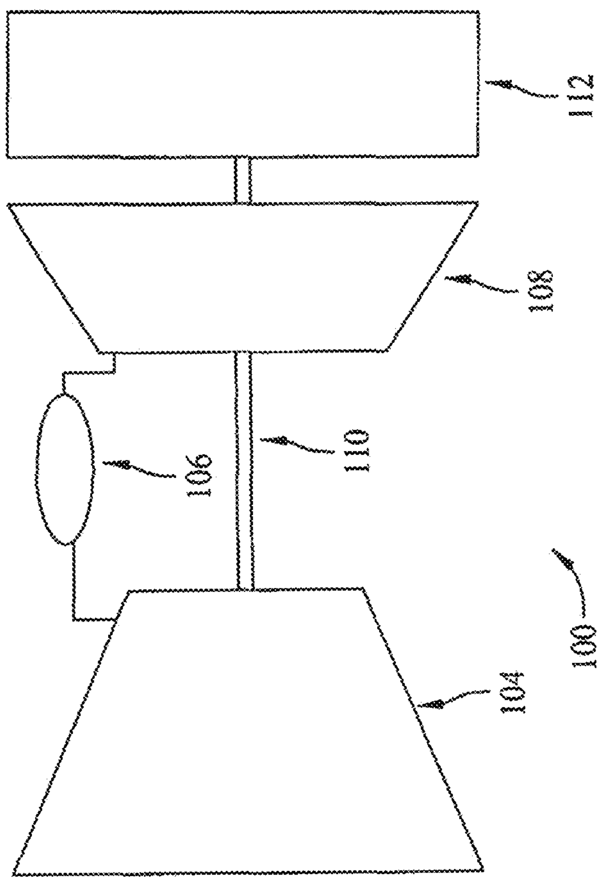
FIG. 1 is a schematic illustration of an exemplary turbine assembly.

FIG. 1 is a schematic illustration of an exemplary turbine assembly 100. In the exemplary embodiment, turbine assembly 100 includes, coupled in a serial flow arrangement, a compressor 104, a combustor assembly 106, and a turbine 108 that is rotatably coupled to compressor 104 via a rotor shaft 110.

During operation, in the exemplary embodiment, ambient air is channeled through an air inlet (not shown) towards compressor 104. The ambient air is compressed by compressor 104 prior it to being directed towards combustor assembly 106. In the exemplary embodiment, compressed air is mixed with fuel, and the resulting fuel-air mixture is ignited within combustor assembly 106 to generate combustion gases that are directed towards turbine 108. Moreover, in the exemplary embodiment, turbine 108 extracts rotational energy from the combustion gases and rotates rotor shaft 110 to drive compressor 104. Furthermore, in the exemplary embodiment, turbine assembly 100 drives a load 112, such as a generator, coupled to rotor shaft 110. In the exemplary embodiment, load 112 is downstream of turbine assembly 100. Alternatively, load 112 may be upstream from turbine assembly 100.

Figure 2:
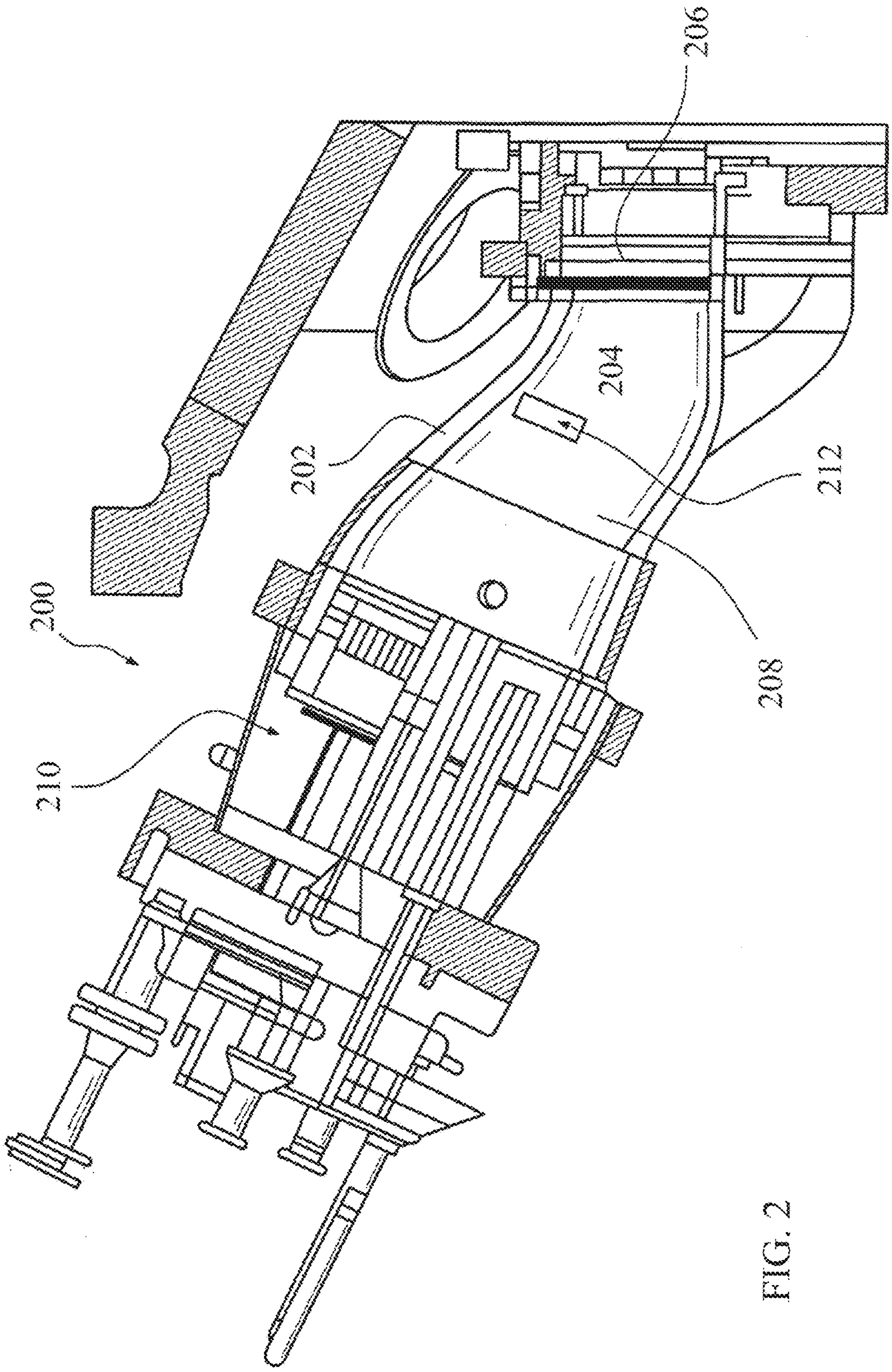
FIG. 2 is a cross-sectional view of an exemplary transition nozzle that may be used with the turbine assembly shown in FIG. 1.

FIG. 2 is a cross-sectional view of an exemplary transition nozzle 200 that may be used with turbine assembly 100. In the exemplary embodiment, transition nozzle 200 has a central axis that is substantially linear. Alternatively, transition nozzle 200 may have a central axis that is canted. Transition nozzle 200 may have any size, shape, and/or orientation suitable to enable transition nozzle 200 to function as described herein.

In the exemplary embodiment, transition nozzle 200 includes in serial flow arrangement a combustion liner portion 202, a transition portion 204, and a turbine nozzle portion 206. In the exemplary embodiment, at least transition portion 204 and nozzle portion 206 are integrated into a single, or unitary, component. More particularly, in the exemplary embodiment, liner portion 202, transition portion 204, and nozzle portion 206 are integrated into a single, or unitary, component. For example, in one embodiment, transition nozzle 200 is cast and/or forged as a single piece.

In the exemplary embodiment, liner portion 202 defines a combustion chamber 208 therein. More specifically, in the exemplary embodiment, liner portion 202 is oriented to receive fuel and/or air at a plurality of different locations (not shown) spaced along an axial length of liner portion 202 to enable fuel flow to be locally controlled for each combustor of combustor assembly 106. Thus, localized control of each combustor facilitates combustor assembly 106 to operate with a substantially uniform fuel-to-air ratio within combustion chamber 208. For example, in the exemplary embodiment, liner portion 202 receives a fuel and air mixture from at least one fuel nozzle 210 and receives fuel from a second stage fuel injector 212 that is downstream from fuel nozzle 210. In another embodiment, a plurality of individually-controllable nozzles are spaced along the axial length of liner portion 202. Alternatively, the fuel and air may be mixed within chamber 208.

In the exemplary embodiment, the fuel and air mixture is ignited within chamber 208 to generate hot combustion gases. In the exemplary embodiment, transition portion 204 is oriented to channel the hot combustion gases downstream towards nozzle portion 206 or, more particularly, towards a stage 1 nozzle. In one embodiment, transition portion 204 includes a throttled end (not shown) that is oriented to channel hot combustion gases at a desired angle towards a stage 1 turbine bucket (not shown). In such an embodiment, the throttled end functions as the stage 1 nozzle. Additionally or alternatively, transition portion 204 may include an extended shroud (not shown) that substantially circumscribes the stage 1 nozzle in an orientation that enables the extended shroud and the stage 1 nozzle to direct the hot combustion gases at a desired angle towards the stage 1 turbine bucket.

In the exemplary embodiment, transition nozzle 200 includes at least one surface feature 214 that is configured to transfer heat away from said transition nozzle 200. As such, surface feature 214 facilitates increasing a heat transfer coefficient of liner portion 202, transition portion 204, and/or nozzle portion 206. More specifically, in the exemplary embodiment, surface feature 214 provides additional surface area to interact with an air and/or fuel flow through transition nozzle 200. Moreover, in the exemplary embodiment, surface feature 214 imparts a flow disruption, or turbulence, to the air and/or fuel flow. As such, surface feature 214 facilitates cooling transition nozzle 200.

The size, shape, and/or orientation of surface feature 214 may vary, for example, according to an operating temperature of combustor assembly 106 and the amount of cooling that is needed, for example, to maintain a particular operating temperature. Surface feature 214 may be integrally formed with transition nozzle 200, coupled to a surface of transition nozzle, and/or machined into a surface of transition nozzle.

Figure 3:
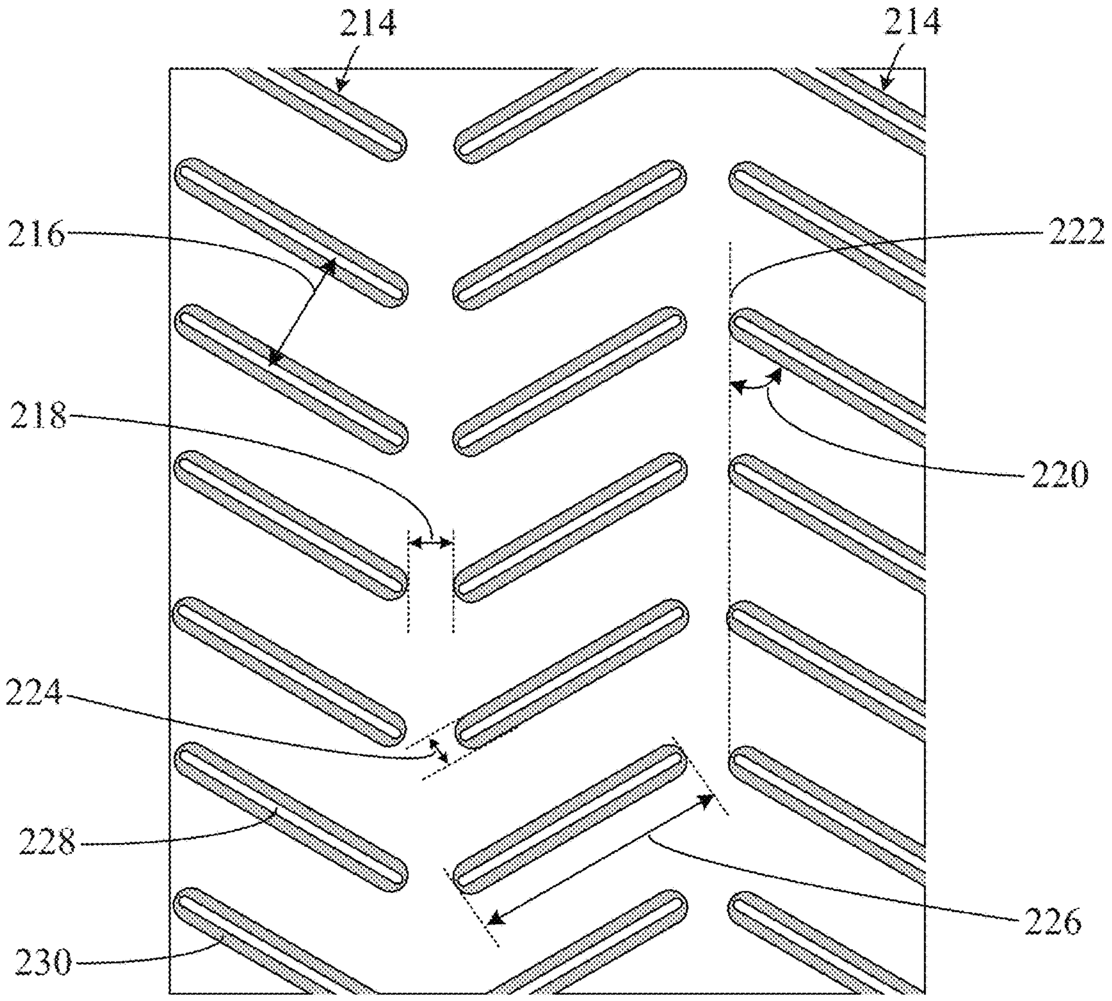
FIGS. 3-7 are top views of exemplary surface features that may be used with the transition nozzle shown in FIG. 2.

In the embodiment shown in FIG. 3, surface feature 214 is an angled turbulator and/or rib. In such an embodiment, a plurality of surface features 214 may be arranged in a chevron array with adjacent rows of surface features 214 spaced a distance 216 between approximately 5.0 mm and 15.0 mm apart and adjacent columns of surface features 214 spaced a distance 218 between approximately 1.0 mm and approximately 5.0 mm. In the one embodiment, surface feature 214 are positioned at an angle 220 between approximately 0° and approximately 45° with respect to a longitudinal axis 222 of transition nozzle 200. In the one embodiment, surface feature 214 may have a height (not shown) between approximately 0.5 mm and approximately 1.0 mm, a width 224 between approximately 0.5 mm and approximately 1.0 mm, and a length 226 between approximately 0.5 cm and approximately 1.5 cm. Surface feature 214 may have either a substantially flat or rounded rib top surface 228. The rib may include a transition portion 230 between a flat, lower region and rib top surface 228 having a transition radius approximately equal to the height of the rib. In the one embodiment, surface feature 214 may be cast in transition nozzle 200 or, more specifically, liner portion 202, transition portion 204, and/or nozzle portion 206.

Figure 4:
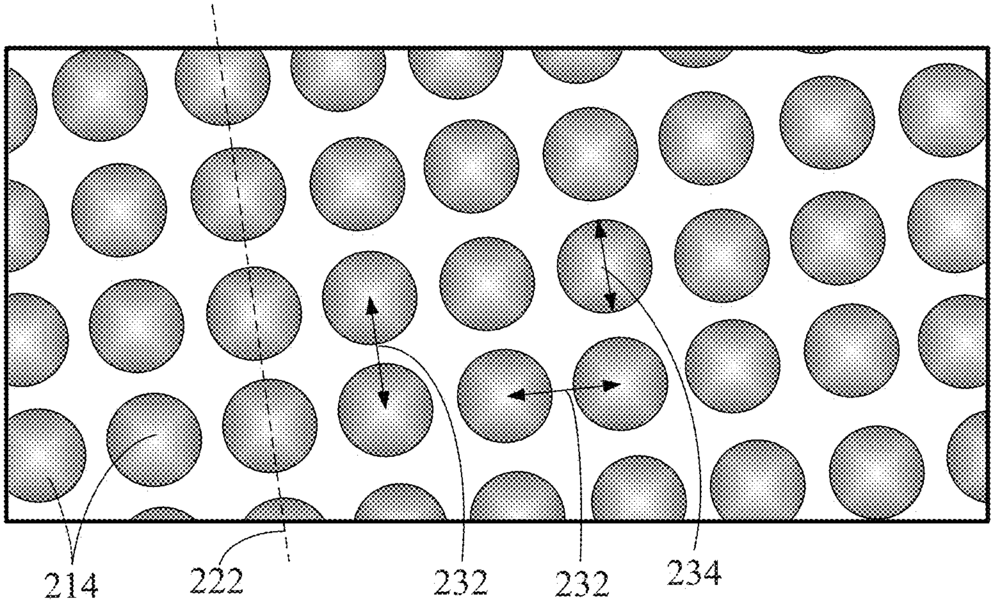

In the embodiment shown in FIG. 4, surface feature 214 is a dimple or concavity. In such an embodiment, a plurality of surface features 214 may be arranged in an array with adjacent surface features 214 spaced a distance 232 between approximately 11.0 mm and 20.0 mm apart. In such an embodiment, a row of surface features 214 may be aligned at any angle (not shown) between approximately 0° and approximately 45° with respect to longitudinal axis 222. In the one embodiment, surface feature 214 has a diameter 234 between approximately 7.0 mm and approximately 13.0 mm, a depth (not shown) between approximately 0.25 mm and approximately 0.5 mm. In the one embodiment, surface feature 214 may be machined into a surface of transition nozzle 200 or, more specifically, liner portion 202, transition portion 204, and/or nozzle portion 206.

Figure 5:
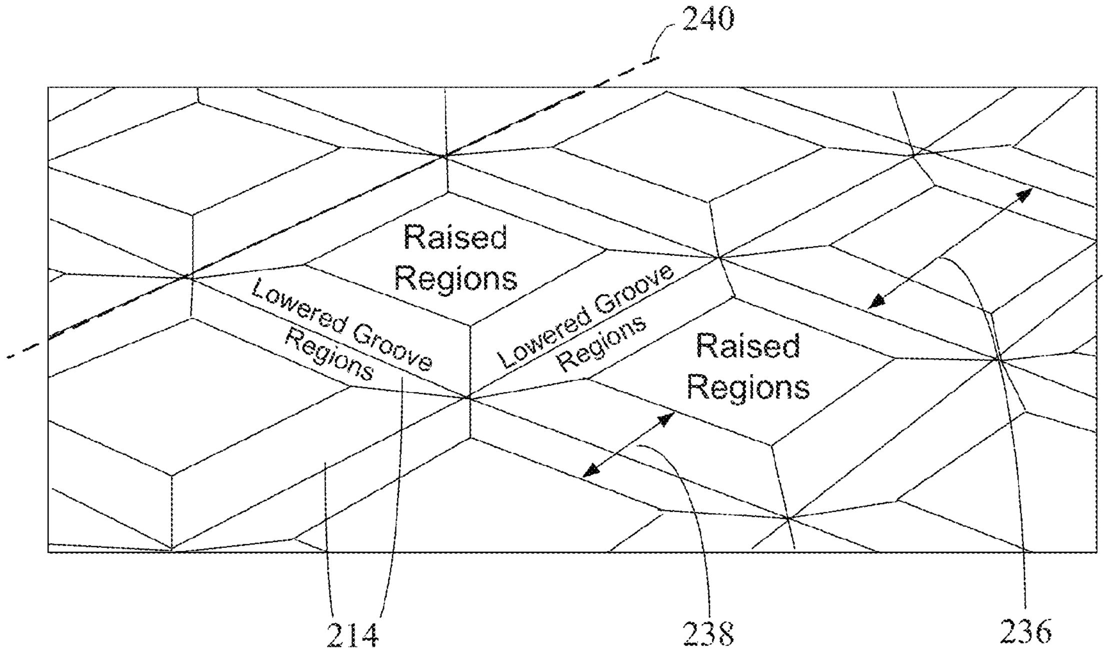

In the embodiment shown in FIG. 5, surface feature 214 is a groove. In such an embodiment, a plurality of surface features 214 may be arranged in an array with adjacent surface features 214 spaced a distance 236 between approximately 5.0 mm and 13.0 mm apart. In the one embodiment, surface feature 214 has a circular depth profile (not shown) with a radius of curvature between approximately 1.0 mm and approximately 3.0 mm. Moreover, in the one embodiment, security feature 214 has a width 238 between approximately 2.0 mm and 8.0 mm. Surface feature 214 may have a center line 240 aligned at any angle (not shown) between approximately 0° and approximately 45° with respect to longitudinal axis 222. In the one embodiment, surface feature 214 may be machined into a surface of transition nozzle 200 or, more specifically, liner portion 202, transition portion 204, and/or nozzle portion 206.

Figure 6:
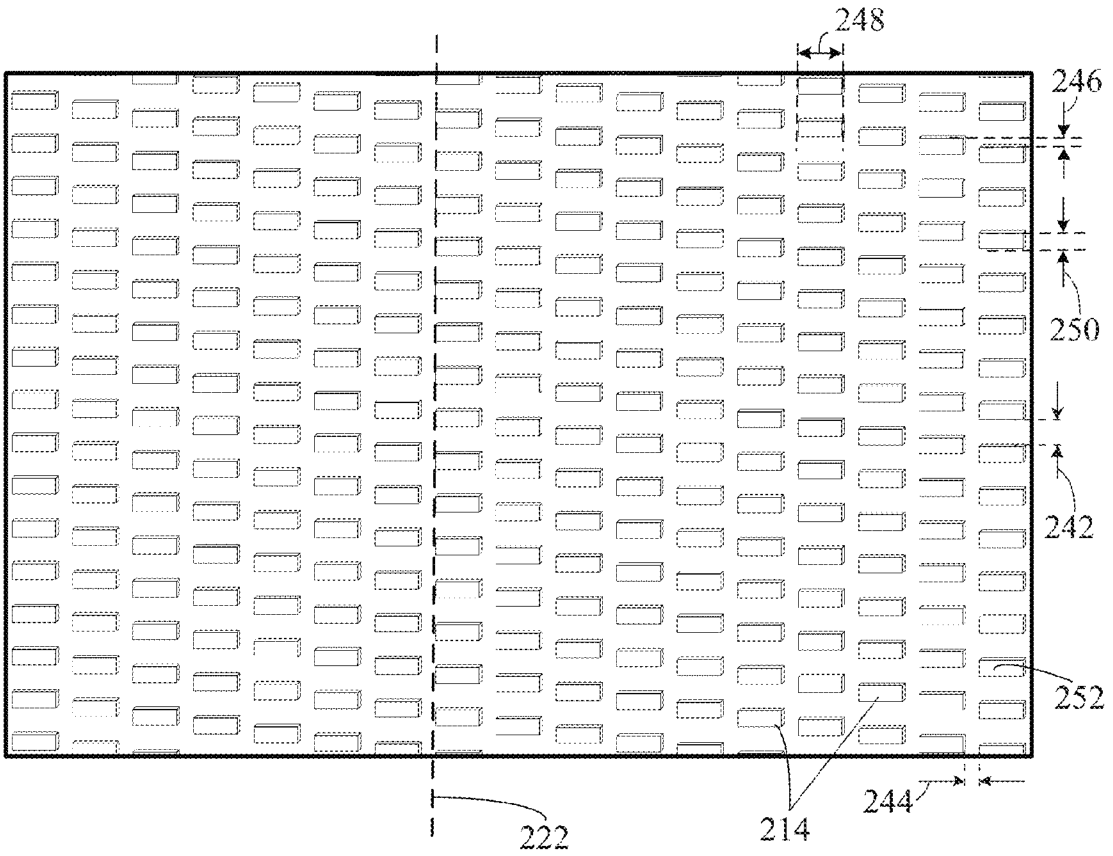

In the embodiment shown in FIG. 6, surface feature 214 is a fin. In such an embodiment, a plurality of surface features 214 may be arranged in an array with adjacent rows of surface features 214 spaced a distance 242 between approximately 2.0 mm and 8.0 mm apart and adjacent columns of surface features 214 spaced a distance 244 between approximately 2.0 mm and approximately 8.0 mm. In such an embodiment, a row of surface features 214 may be aligned at any angle (not shown) between approximately 0° and approximately 90° with respect to longitudinal axis 222. Moreover, in such an embodiment, surface features 214 may be aligned in alternating rows offset a distance 246 approximately 0.0 mm and 5.0 mm. In the one embodiment, surface feature 214 has a height (not shown) between approximately 0.5 mm and 3.0 mm, a width 248 between approximately 1.0 mm and approximately 7.0 mm, and a length 250 between approximately 1.0 mm and approximately 7.0 mm. Surface feature 214 may have either a substantially flat or rounded fin top surface 252. Alternatively, surface feature 214 may also transition from a flat, lower region to the fin top surface 252 with a transition radius of approximately 0.1 mm. In the one embodiment, surface feature 214 may be cast in transition nozzle 200 or, more specifically, liner portion 202, transition portion 204, and/or nozzle portion 206.

Figure 7:
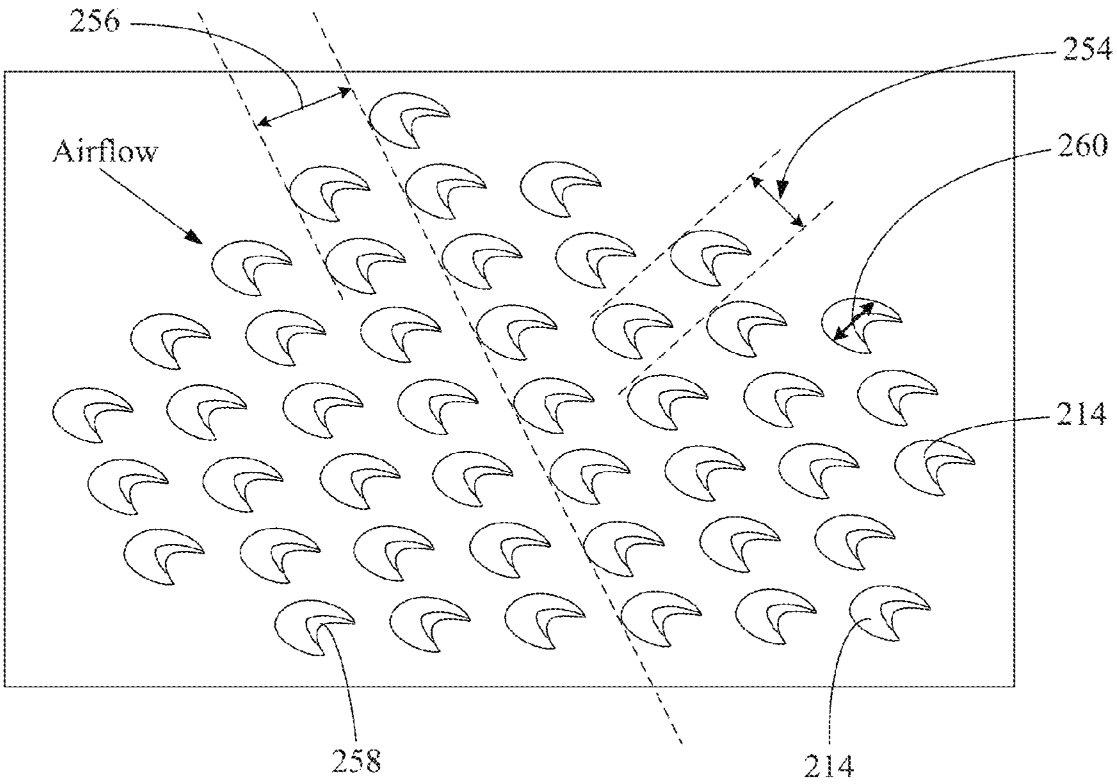

In the embodiment shown in FIG. 7, surface feature 214 is a curved dune. In such an embodiment, a plurality of surface features 214 may be arranged in an array with a dune row period 254 between approximately 11.0 mm and approximately 22.0 mm and a dune column period 256 between approximately 11.0 mm and approximately 20.0 mm. In the one embodiment, surface feature 214 has a sand dune-type shape. That is, surface feature 214 is a curved dune with a solid cylindrical cutout 258 on one side of the curved dune having a cutout angle (not shown) approximately 45° with respect to a line normal to the surface and a cutout diameter approximately one-half of a dune diameter 260. Alternatively, the cutout portion may be positioned towards a head end of the curved dune. In the one embodiment, surface feature 214 may have a height (not shown) between approximately 1.0 mm and approximately 3.0 mm, and diameter 260 between approximately 7.0 mm and approximately 13.0 mm. In the one embodiment, surface feature 214 may be cast in transition nozzle 200 or, more specifically, liner portion 202, transition portion 204, and/or nozzle portion 206.

During operation, in the exemplary embodiment, a fuel and air mixture is combusted within combustion chamber 208 to generate combustion gases that are subsequently channeled towards turbine nozzle 206. Air is channeled adjacent to surface feature 214 to facilitate cooling liner portion 202, transition portion 204, and/or nozzle portion 206. As described in more detail above, the unitary component includes at least one surface feature 214 configured to transfer heat away from the unitary component.

The embodiments described herein enable an interaction between the air and the surface features to be increased and, thus, a heat removal process of the transition nozzle to be enhanced. The integrated structure allows for a reduction in the number of parts required to complete the heat addition and flow throttling for the gas turbine design. A reduced part count also will reduce costs and outage time. The cooling enables the combustor to operate with increased operating temperatures and, thus, increased emissions capabilities.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the invention, including the best mode, and also to enable any person skilled in the art to practice those certain embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a turbine assembly, said method comprising:

integrally forming a transition nozzle comprising a transition piece that defines a transition portion and further comprising a turbine nozzle that defines a turbine nozzle portion as a first stage nozzle;

positioning at least one surface feature consisting of at least one of a protrusion or an indentation to transfer heat away from the turbine nozzle portion, wherein the turbine nozzle portion having a cold side surface opposite a hot side surface includes the at least one surface feature formed or attached on the cold side surface;

orienting the transition portion to channel combustion gases towards the turbine nozzle portion; and orienting the turbine nozzle portion to channel the hot combustion gases towards a turbine bucket at a predefined angle.

2. A method in accordance with claim 1, wherein integrally forming the transition nozzle further comprises integrally forming the transition nozzle to include a combustion liner portion such that the combustion liner portion, the transition portion, and the turbine nozzle portion forms a unitary component, wherein the combustion liner portion at least partly defines a combustion chamber of the turbine assembly, and wherein the transition portion is oriented to channel combustion gases from the combustion liner portion.

3. A method in accordance with claim 2, wherein positioning at least one surface feature further comprises providing a first surface feature on a surface of the combustion liner portion, a second surface feature on a surface of the turbine nozzle portion, and a third surface feature on a surface of the transition portion, wherein the at least one surface feature includes the first surface feature, the second surface feature, and the third surface feature.

4. A method in accordance with claim 1, wherein positioning at least one surface feature further comprises integrally forming the at least one surface feature with the transition nozzle.

5. A method in accordance with claim 1, wherein positioning at least one surface feature further comprises coupling the at least one surface feature to a surface of the transition nozzle.

6. A method in accordance with claim 1, wherein positioning at least one surface feature further comprises machining the at least one surface feature into a surface of the transition nozzle.

7. A transition nozzle for use with a turbine assembly, said transition nozzle comprising:

a transition piece defining a transition portion;

a turbine nozzle defining a turbine nozzle portion as a first stage nozzle, said turbine nozzle portion having a cold side surface opposite a hot side surface integrally formed with said transition portion, wherein said transition portion is oriented to channel combustion gases towards said turbine nozzle portion, and wherein said turbine nozzle portion is oriented to channel the combustions gases towards a turbine bucket at a predetermined angle; and at least one surface feature consisting of at least one of a protrusion or an indentation formed or attached on the cold side surface of said turbine nozzle portion and configured to transfer heat away from said turbine nozzle portion.

8. A transition nozzle in accordance with claim 7 further comprising a combustion liner portion integrally formed with said transition and turbine nozzle portions to form a unitary component, wherein said combustion liner portion at least partly defines a combustion chamber of the turbine assembly, and wherein said transition portion is oriented to channel combustion gases from said combustion liner portion.

9. A transition nozzle in accordance with claim 8, wherein said combustion liner portion is configured to receive a fuel and air mixture at a plurality of locations along an axial length of said combustion liner portion.

10. A transition nozzle in accordance with claim 8, wherein said combustion liner portion, said turbine nozzle portion, and said transition portion each comprise said at least one surface feature.

11. A transition nozzle in accordance with claim 7, wherein said at least one surface feature is integrally formed with at least one of said transition portion and said turbine nozzle portion.

12. A transition nozzle in accordance with claim 7, wherein said at least one surface feature is coupled to a surface of at least one of said transition portion and said turbine nozzle portion.

13. A transition nozzle in accordance with claim 7, wherein said at least one surface feature is machined into a surface of at least one of said transition portion and said turbine nozzle portion.

14. A turbine assembly comprising:

a fuel nozzle configured to mix fuel and air to create a fuel and air mixture; and a transition nozzle oriented to receive the fuel and air mixture from said fuel nozzle, said transition nozzle comprising:

a transition piece defining a transition portion;

a turbine nozzle defining a turbine nozzle portion as a first stage nozzle, said turbine nozzle portion having a cold side surface opposite a hot side surface integrally formed with said transition portion; and at least one surface feature consisting of at least one of a protrusion or an indentation formed or attached on the cold side surface of the turbine nozzle configured to transfer heat away from said turbine nozzle portion, wherein said transition portion is oriented to channel the combustion gases towards said turbine nozzle portion, and wherein said turbine nozzle portion is oriented to channel the combustions gases towards a turbine bucket at a predetermined angle.

15. A turbine assembly in accordance with claim 14, wherein said transition nozzle further comprises a combustion liner portion integrally formed with said transition and turbine nozzle portions to form a unitary component, wherein said combustion liner portion at least partly defines a combustion chamber of the turbine assembly, and wherein said transition portion is oriented to channel combustion gases from said combustion liner portion.

16. A turbine assembly in accordance with claim 15, wherein said combustion liner portion is configured to receive the fuel and air mixture at a plurality of locations along an axial length of said combustion liner portion.

17. A turbine assembly in accordance with claim 15, wherein said combustion liner portion, said turbine nozzle portion, and said transition portion each comprise said at least one surface feature.

18. A turbine assembly in accordance with claim 14, wherein said at least one surface feature is integrally formed with at least one of said transition portion and said turbine nozzle portion.

19. A turbine assembly in accordance with claim 14, wherein said at least one surface feature is coupled to a surface of at least one of said transition portion and said turbine nozzle portion.

20. A turbine assembly in accordance with claim 14, wherein said at least one surface feature is machined into a surface of at least one of said transition portion and said turbine nozzle portion.

* * * * *